United States Patent [19]

Muehlhausen

[11] Patent Number: 4,935,834
[45] Date of Patent: Jun. 19, 1990

[54] SHUTTER SPRING FOR DISK CARTRIDGE

[75] Inventor: Robert A. Muehlhausen, May Township, Washington County, Minn.

[73] Assignee: Minnesota Mining and Manufacturing Company, St. Paul, Minn.

[21] Appl. No.: 270,358

[22] Filed: Nov. 14, 1988

[51] Int. Cl.⁵ .............................................. G11B 23/03
[52] U.S. Cl. ................................................... 360/133
[58] Field of Search ................. 360/133; 369/291, 292; 206/444

[56] References Cited

U.S. PATENT DOCUMENTS 4,630,159 12/1986 Saito ..................................... 360/133
4,680,662 7/1987 Fukushima et al. ................. 360/133

FOREIGN PATENT DOCUMENTS 0277809 8/1988 European Pat. Off. ............ 360/133
0072687 4/1984 Japan ................................... 360/133

Primary Examiner—David J. Serverin
Attorney, Agent, or Firm—Donald M. Sell; Walter N. Kirn; David W. Anderson

[57] ABSTRACT

A disk cartridge for a rotatable recording disk includes a slidable shutter for providing access to the recording disk through the disk cartridge. A unique mounting for a return spring for the shutter allows the return spring to be of a maximum length which allows increased control of the forces generated by the return spring. The disk cartridge is further provided with a locking mechanism for preventing movement of the recording disk within the disk cartridge during storage.

2 Claims, 3 Drawing Sheets

SHUTTER SPRING FOR DISK CARTRIDGE

BACKGROUND OF THE INVENTION

1. Technical Field of the Invention

The present invention relates to a disk cartridge which includes a protective housing enclosing a rotatable recording disk of the optical or magnetic type.

2. Description of the Prior Art

Disk cartridges contemplated by this invention may be of the familiar 3½ inch Floppy format or the more recent optical disk cartridge. The 3½ inch Floppy disk cartridge includes a rectangular plastic shell enclosing a circular disk which is rotated during operation and accessed during operation by magnetic heads capable of recording or reading information to or from the recording disk. The housing is provided with a movable shutter which may be slid between an open position providing access of the magnetic heads to the recording disk and a closed position which seals the housing and prevents contamination of the recording disk during storage. The shutter is provided with a spring to return the shutter to the closed position when the cartridge is removed from a drive mechanism including the magnetic heads and means for rotating the recording disk.

Common problems with the shutter return spring of such cartridges are that a reliable residual force is not provided by the spring to retain the shutter in the closed position during storage and inadequate control over the spring forces produced between the shutter open and closed position. Another problem associated with disk cartridges of the type described above is that the recording disk is free to move within the cartridge during storage. This results in an objectionable rattle of the disk within the cartridge and may result in damage to the recording disk.

Optical recording disk cartridges have a similar construction to that of the 3½ inch Floppy disk cartridges, and have the same problems described above with respect to the 3½ inch cartridge. The present invention addresses both the magnetic and optical disk cartridge types and is applicable to any cartridge which comprises a housing having a sliding shutter and which encloses a disk which is rotated during operation.

SUMMARY OF THE INVENTION

The present invention addresses control of the shutter return spring forces by providing a helical extension spring having a first end and a second end wherein the first end is attached to the disk cartridge housing substantially at the perimeter of the housing and wherein the second end of the spring is attached to the shutter at a point substantially as far removed as possible from the spring first end so that the length of the spring is maximized in the direction of movement of the shutter to provide increased control over the range of forces produced by the spring.

The problem of unwanted movement of the recording disk within the disk cartridge is addressed by providing a locking lever pivotally mounted within and to the disk cartridge housing, which locking lever includes a first end for contact with the recording disk and a second end disposed opposite the pivotal mounting of the locking lever for contact with the shutter when the shutter is in the closed position so that the first end of the locking lever is forced into contact with the recording disk when the shutter is in the closed position. The locking mechanism preferably includes biasing means connected between the locking lever and the disk cartridge housing for biasing the locking lever out of contact with the recording disk when the shutter is in the open position. Also preferably, the locking mechanism includes a resilient arm attached to the second end of the locking lever for contact with the shutter when the shutter is in the closed position so that the first end of the locking lever is resiliently urged into contact with the recording disk.

BRIEF DESCRIPTION OF THE DRAWINGS

The present invention will be more thoroughly described with reference to the attached drawings wherein like numbers refer to like parts in the several views, and wherein.

DESCRIPTION OF THE PREFERRED EMBODIMENT

Figure 1:
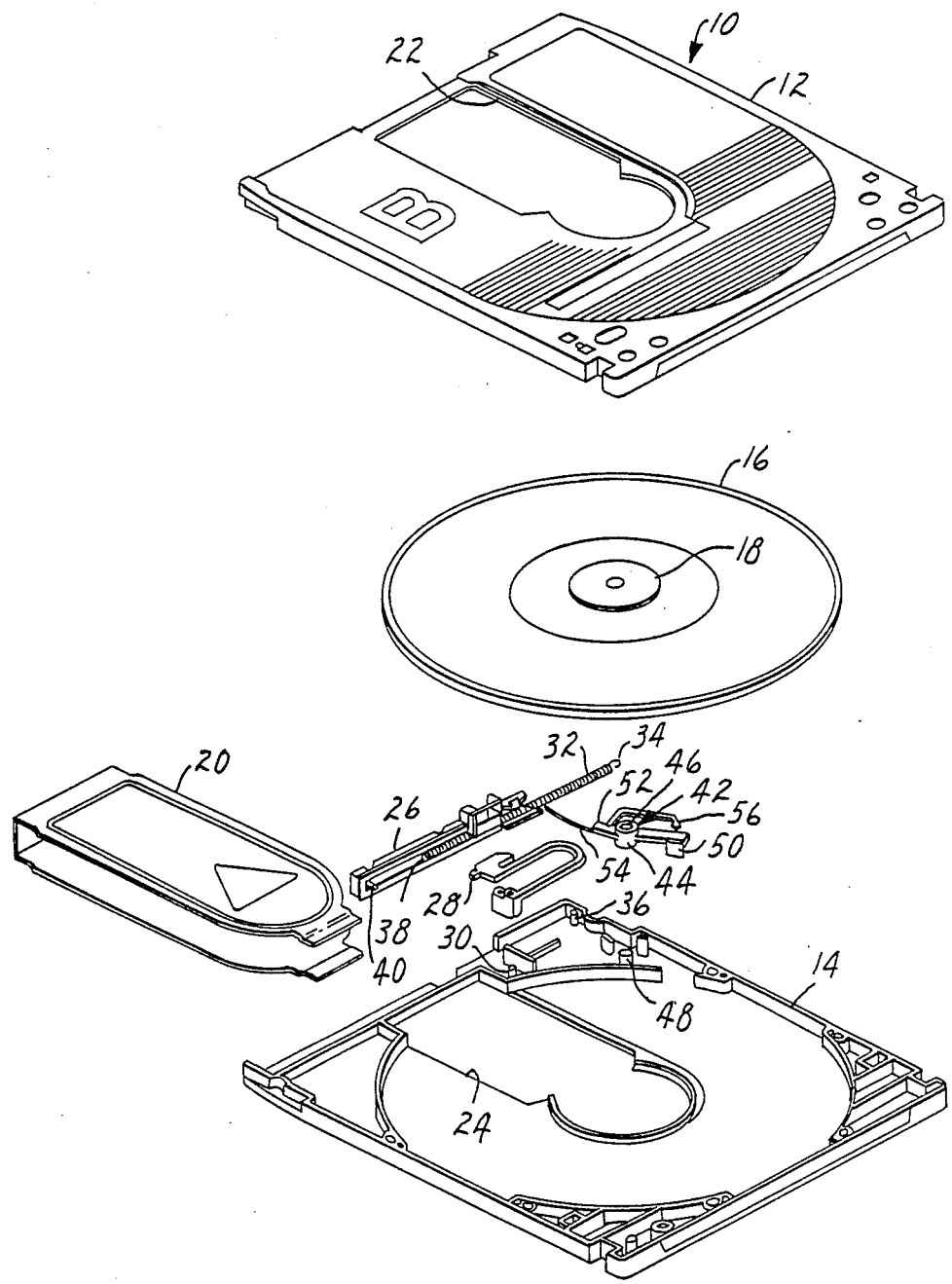
FIG. 1 is an exploded perspective view of a disk cartridge according to the present invention.
Figure 2:
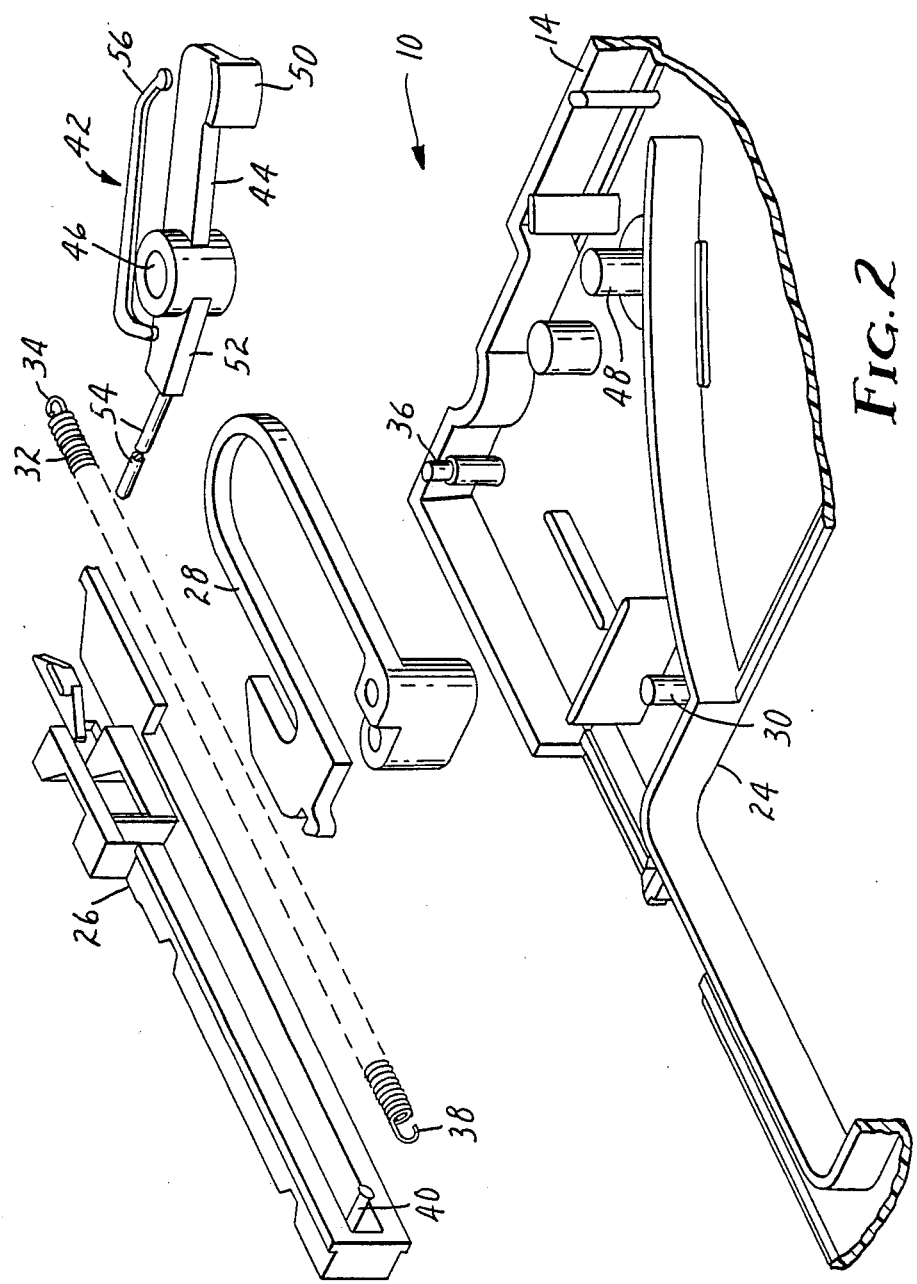
FIG. 2 is an enlarged, exploded perspective of a portion of the disk cartridge of FIG. 1 and associated internal parts.

FIGS. 1 and 2 illustrate a disk cartridge 10 which includes an upper cartridge half 12 and a lower cartridge 14 which may be combined in register to form a square enclosure for a circular recording disk 16.

The recording disk may be of either the magnetic or optical type wherein the recording disk 16 is rotated in proximity to appropriate recording heads capable of transcribing information to the disk 16 or reading information therefrom.

The cartridge 10 is adapted to be inserted into a disk drive (not shown) which includes the necessary recording heads and means for rotating the recording disk 16 through a central recording disk hub 18.

The cartridge 10 is provided with a shutter 20 which may be slid relative to the cartridge 10 between an open position and a closed position. The closed position is the position of the shutter 20 wherein the shutter 20 covers an opening 22 in the upper cartridge half 12 and an opening 24 in the lower cartridge half 14. From this closed position, the shutter 20 may be slid to the left, as viewed in FIG. 1, to an open position which provides access to the recording disk 16 through the openings 22 and 24 of the cartridge halves 12 and 14.

The shutter 20 is preferably attached to a carrier 26 which is provided for smoothness of operation, but the carrier 26 may be eliminated and the shutter 20 attached directly to the disk cartridge 10. The cartridge 20 further includes a latch 28 mounted in the interior of the cartridge 10 to a pin 30. The latch is provided to retain the shutter 20 in the closed position until depressed by a mechanism within the drive accepting the disk cartridge 10.

A helical extension spring 32 is provided within the disk cartridge 10 to bias the shutter 20 towards the closed position. The spring 32 includes a first looped end 34 which is attached to a mounting pin 36 located as close as possible to the perimeter of the disk cartridge 10. A second looped end 38 of the helical spring 32 is attached to the carrier 26 at a mounting pin 40 located on the end of the carrier 26 which is opposite the first end 34 of the spring 32. Thus the second end 38 of the spring 32 is attached to the shutter (or the carrier 26, if provided) at a point which is substantially as far removed as possible from the first end 34 of the spring 32 so that the mounted length of the spring 32 is maximized in the direction of sliding movement of the shutter 20 between the open and closed position.

By mounting the second end 38 of the spring 32 to the side of the shutter 20 farthest removed from the first mounting end 34 of the spring 32, as opposed to mounting the second end 38 of the spring 32 to that side of the shutter nearer the first end 34 of the spring 32, increased control over the forces generated by the spring 32 is provided. It has been found that the increased length of the spring 32 made possible by attaching the spring 32 to the far end of the shutter 20 permits greater control over the force generated by the spring when the shutter 20 is in the closed position, the forces generated by the spring 32 during movement of the shutter 20 from the closed position to the open position and the maximum force generated by the spring 32 when the shutter 20 is in the fully open position. The forces generated by the spring 32 typically and preferably range from approximately 100 grams with the shutter in the closed position to 300 grams when the shutter 20 is in the open position.

Thus the first aspect of the present invention is a mounting for the helical spring 32 which provides a mounting for the first end 34 of the spring 32 substantially at the perimeter of the cartridge 10 and a mounting for the second end 38 of the spring 32 at the side of the shutter farthest removed from the first end 34 of the spring 32.

A second aspect of the present invention concerns movement of the recording disk 16 within the cartridge 10 when the cartridge 10 has been removed from its associated drive for storage. Because the recording disk 16 must be free to rotate within the disk 10 during operation, the disk 16 is, of course, free to move within the cartridge 10 when the cartridge 10 is removed from its associated drive mechanism. This movement of the disk 16 within the cartridge 10 results in an objectionable rattling of the disk 16 and may result in damage to the disk 16 by contact with the interior of the disk cartridge 10.

Figure 4:
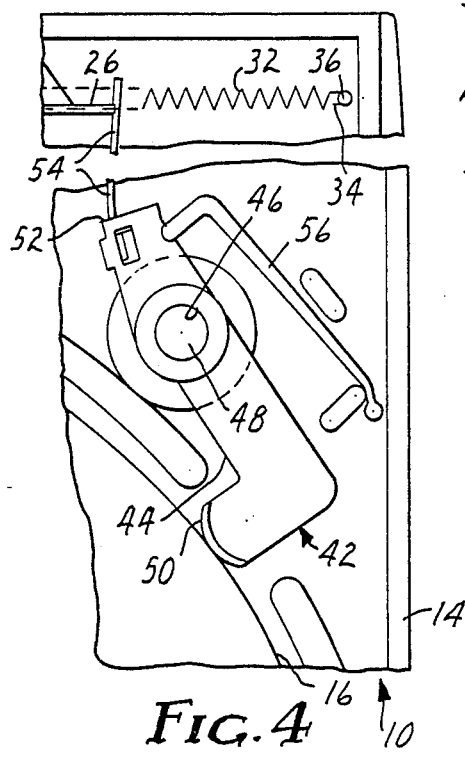
FIG. 4 is identical to FIG. 3 with the exception that internal parts of the disk cartridge of FIG. 1 are shown in an operative position.
Figure 3:
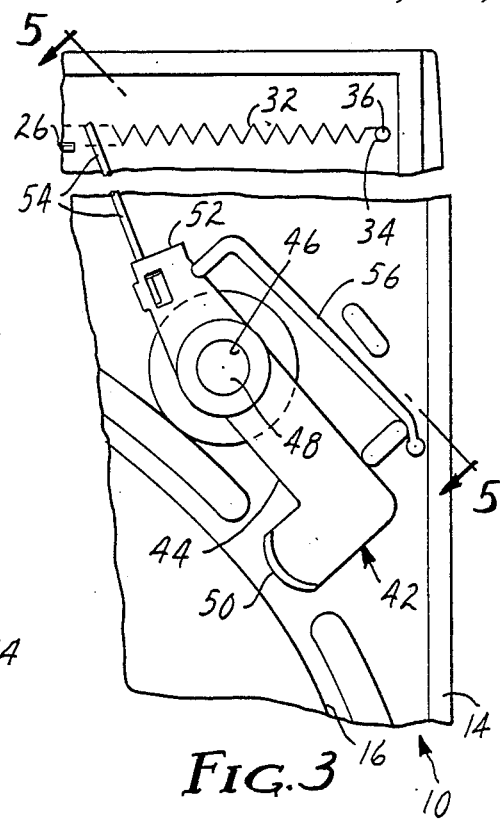
FIG. 3 is a plan view of a portion of the disk cartridge of FIG. 1 with the cover removed to reveal internal parts.
Figure 5:
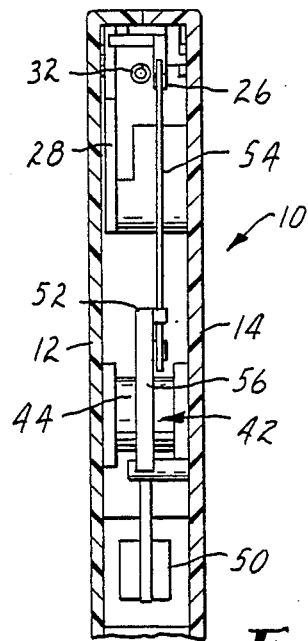
FIG. 5 is an elevational view of the disk cartridge of FIG. 1 taken generally along the line 5—5 of FIG. 3.

In order to prevent this rattling of the recording disk 16, the disk cartridge 10 is provided with a locking mechanism 42 in the form of a locking lever 44 having a central bore 46 which is mounted and journaled on a pin 48 extending from the lower cartridge half 14. As best seen in FIGS. 3 and 4, the locking lever 44 includes a first end 50 for contact with the recording disk 16 and a second end 52 disposed opposite the bore 46 for contact with the shutter 20 when the shutter 20 is in the closed position so that contact between second end 52 of the locking lever 44 and the shutter 20 forces the first end 50 of the locking lever 44 into contact with the recording disk 16. As shown in FIGS. 3 and 4 the second end 52 of the locking lever 44 does not contact the shutter 20 directly, but rather by means of a resilient arm 54 which is attached to the second end 52 of the locking lever 44 and extends toward the shutter 20 to contact the shutter when the shutter 20 is in the closed position. Since the arm 54 is resilient, it yields when contacted by the shutter 20 and provides a resilient biasing force to the locking lever 44 which maintains the first end 50 of the locking lever 44 in contact with the recording disk 16.

Although contact has been referred to as being between the locking lever 44 and the shutter 20, it will be recognized that contact will actually be between the locking lever 44 and the carrier 26 for the shutter 20, if the shutter is so provided.

The locking lever 44 is further provided with a return spring 56 which contacts an upstanding stud 58 extending from the interior of the lower cartridge half 14 adjacent the locking lever 44. As may be seen in FIG. 4, movement of the first end 50 of the locking lever 44 toward the recording disk 16 causes resilient deformation of the return spring 56 which produces a restoring force tending to retract the first end 50 of the locking lever 44 from the recording disk 16. Thus the first end 50 of the locking lever 44 is retracted by the return spring 56 when the shutter 20 (or the carrier 26) moves from the closed position to the open position and therefore out of contact with the resilient arm 54 connected to the second end 52 of the locking lever 44.

I claim:

1. A return spring mounting for a disc cartridge including a housing enclosing a recording disc and having a substantially 90 degree corner adjacent the disc and a shutter means slideable between an open position providing access to the disc through the housing and a closed position preventing access to the disc for protection of the disc, said return spring mounting including:
   a helical extension spring having a first end and a second end wherein said first end is attached to said housing substantially at said corner of said housing and wherein said second end of said spring is attached to said shutter means at a point substantially as far removed from said spring first end as possible to maximize the length of said spring in the direction of movement of said shutter means between said first position and said second position to provide increased control over the range of forces produced by said spring.

2. A return spring mounting according to claim 1 wherein said shutter means includes a carrier slideably connected to said housing to move said shutter means between said open and said closed positions, and wherein said second end of said spring is attached to said carrier at a point substantially as far removed from said spring first end as possible.

* * * * *